(12) United States Patent
Maeda

(10) Patent No.: US 7,677,069 B2
(45) Date of Patent: Mar. 16, 2010

(54) THREADED JOINT FOR AN OIL WELL PIPE AND METHOD FOR MANUFACTURING SAME

(75) Inventor: Jun Maeda, Osaka (JP)

(73) Assignee: Sumitomo Metal Industries, Ltd., Osaka (JP)

( * ) Notice: Subject to any disclaimer, the term of this patent is extended or adjusted under 35 U.S.C. 154(b) by 805 days.

(21) Appl. No.: 10/588,280

(22) PCT Filed: Feb. 1, 2005

(86) PCT No.: PCT/JP2005/001425

§ 371 (c)(1), (2), (4) Date: Aug. 4, 2006

(87) PCT Pub. No.: WO2005/075873

PCT Pub. Date: Aug. 18, 2005

(65) Prior Publication Data

US 2007/0132238 A1    Jun. 14, 2007

(30) Foreign Application Priority Data

Feb. 6, 2004    (JP) .............................. 2004-031327

(51) Int. Cl.
*F16L 15/00*    (2006.01)
*F16L 25/00*    (2006.01)
*B22D 11/126*    (2006.01)

(52) U.S. Cl. .............................. 72/53; 29/90.7; 451/39; 285/334; 285/390

(58) Field of Classification Search .................. 285/390, 285/324, 328, 334, 334.4; 451/39; 411/392, 411/389, 411; 29/90.7, 893.2, 527.7; 72/53
See application file for complete search history.

(56) References Cited

U.S. PATENT DOCUMENTS

| | | | | | |
|---|---|---|---|---|---|
| 2,641,488 | A | * | 6/1953 | Dunn et al. | 285/390 |
| 4,167,864 | A | * | 9/1979 | Taipale | 72/53 |
| 4,386,458 | A | * | 6/1983 | Evans | 29/527.7 |
| 4,549,754 | A | * | 10/1985 | Saunders et al. | 285/334 |
| 5,297,338 | A | * | 3/1994 | Ishida et al. | 29/893.2 |
| 5,498,035 | A | * | 3/1996 | Blose et al. | 285/94 |
| 5,700,120 | A | * | 12/1997 | Manning et al. | 411/389 |
| 6,099,391 | A | * | 8/2000 | Suzuki et al. | 451/39 |
| 6,755,447 | B2 | * | 6/2004 | Galle et al. | 285/390 |

FOREIGN PATENT DOCUMENTS

| | | |
|---|---|---|
| EP | 1 281 905 | 2/2003 |
| JP | 04-269166 | 9/1992 |
| JP | 06-099354 | 4/1994 |
| JP | 08-145248 | 6/1996 |

* cited by examiner

*Primary Examiner*—David B Jones
(74) *Attorney, Agent, or Firm*—Clark & Brody

(57) ABSTRACT

A threaded joint for an oil well pipe in which a conventional threaded joint for an oil well pipe is improved so that sufficient fatigue fracture strength is secured, and a method for manufacturing the same are provided. An axial-direction residual stress of a threaded bottom part is set to −400 MPa or less as a value of X-ray stress analysis between a surface and a part with a depth of 40 μm.

12 Claims, 8 Drawing Sheets

THREADED JOINT FOR AN OIL WELL PIPE AND METHOD FOR MANUFACTURING SAME

TECHNICAL FIELD

The present invention relates to a threaded joint for an oil well pipe and method for manufacturing the same.

BACKGROUND ART

In recent years, since the exploration technique and extractive technique for oil fields and gas fields are improved, it is not uncommon to produce oil from oil fields at a depth of thousands meters. An enormous number of oil well pipes are used in such oil wells, and each oil well pipe maintains seal property by means of a threaded joint and the oil well pipes are connected into one so as to be used.

Japanese Patent Application Laid-Open No. H06-99354 discloses a technique in which a metal-to-metal seal part of a steel pipe joint is subject to the shot peening treatment in order to improve galling resistance by means of heightening of surface hardness. Further, Japanese Patent Application Laid-Open No. H08-145248 discloses a technique in which the hardness of a male or female threaded seal part is heightened and surface roughness of the threaded seal part with the heightened hardness is prescribed to 0.25 to 1.00 μm so that the galling resistance of high-chrome steel containing Cr of 10% or more in weight ratio is improved.

DISCLOSURE OF THE INVENTION

Problems to be Solved by the Invention

In recent years, the development of oil fields or gas fields in ocean location spreads across deeper locations and locations where the development is more difficult. Accordingly, fatigue fracture strength is more important than the galling resistance in pipes under the sea between the seabed and rigs on the sea, and thus joints having high fatigue fracture strength are often being demanded.

One of the methods for heightening the fatigue fracture strength of the threaded joints for oil well pipes is a method in which liner joints for oil production originally manufactured with the high fatigue fracture strength are turned over or special joints are developed to be used, but such a method costs a lot of money. The demands on existent particular joints or the existent particular joints which have necessary performance due to improvement are, therefore, increased. On the other hand, as a general method for heightening the fatigue fracture strength of materials, a method for giving the shot peening treatment to the surfaces of materials so as to heighten the surface hardness is publicly known.

Japanese Patent Application Laid-Open Nos. 6-99354 and 8-145248 do not include an idea of improving the fatigue fracture strength, and thus their contents do not disclose technical means for improving the fatigue fracture strength.

Further, the source of the fatigue fracture in the threaded joints for oil well pipes is mostly the threaded parts, and thus it is difficult to treat the threaded parts smoothly using the conventional shot peening. This is because the threaded joints for oil well pipes generally adopt a special threaded shape such as an API threaded shape.

For example, in the case of a buttress threaded shape shown in FIG. 7, a threaded bottom corner curved part which is a critical point of the fatigue fracture strength in the threaded joints has a radius of 0.2 mm. It is, therefore, unreasonable to obtain uniform hardness by applying the conventional shot peening which uses particles with minimum diameter of about 0.5 mm to this part. Particularly, it is out of the question to try to apply the conventional shot peening to a threaded joint for an oil well pipe with an API round threaded shape shown in FIG. 8.

It is, therefore, an object of the present invention to provide a threaded joint for an oil well pipe in which the sufficient fatigue fracture strength is secured by improving a conventional threaded joint for an oil well pipe formed with a thread having a special shape such as an API buttress threaded shape or a round threaded shape, and a method for manufacturing the same.

Means for Solving the Problems

The present invention will be explained below. For easy understanding of the present invention, reference numerals in the attached drawings are bracketed, but the present invention is not limited to the forms in the drawings due to the brackets.

A first aspect of the present invention is a threaded joint for an oil well pipe in which an axial-direction residual stress of a threaded bottom part is −400 MPa or less as a value in X-ray stress analysis between a surface and a part with a depth of 40 μm.

According to the threaded joint for an oil well pipe of the first aspect, the stress of 400 MPa or more in the compressive direction remains from the surface of a metallic material composing the joint to the part with a depth of 40 μm. Crack is, therefore, hardly generated near the material surface, and the fatigue fracture strength of the metallic material is high. Therefore, the threaded joint for an oil well pipe which can be applied to deeper oil fields and gas field where development is difficult can be provided.

A second aspect of the present invention is a method for manufacturing a threaded joint for an oil well pipe, comprising a step of injecting and spraying particles having hardness of HRC50 or more and a particle diameter of 30 to 300 μm to a surface of a material to be treated at air pressure of 0.3 to 0.5 MPa. The "particle diameter" means a particle diameter of a median in aggregate of particles with constant diameter range. Further, the step of injecting and spraying the fine particles to the surface of the material to be treated is called as "micro-shot peening".

In the method for manufacturing the threaded joint for an oil well pipe of the second aspect, the micro-shot peening is applied to a conventional threaded joint for an oil well pipe so that its fatigue fracture strength is improved.

Therefore, since the threaded joint for an oil well pipe which has been conventionally used is used without requiring special design or material for improving the fatigue fracture strength, this method has an advantage of low cost. Further, according to the method for manufacturing the threaded joint for an oil well pipe of the second aspect, the particles which are harder and finer than the material to be treated are injected and sprayed to the surface of the material composing the threaded joint for an oil well pipe at a high speed. Accordingly, the maximum residual stress in the compressive direction is generated on a comparatively shallow portion near the surface of the material, and this suppresses generation of crack as a source of the fatigue fracture. Since the particles to be injected are fine, even if each portion of the threaded joint for an oil well pipe has a complicated shape or a minute shape, the particles are sprayed smoothly. The fatigue fracture strength can be, therefore, improved uniformly across the entire surface of the threaded joint for an oil well pipe.

In the second aspect, a thread shape may be any one of an API buttress thread and a round thread.

Accordingly, the particles can be injected into a bending part of the threaded bottom corner where conventional particles with a larger particle diameter cannot be injected by the shot peening, so that the characteristic of the micro-shot peening such that sufficient fatigue strength can be secured can be provided.

In the second aspect (including modified example), it is preferable that the particle diameter is 50 to 100 μm.

In the case of such a constitution, larger maximum compressive-direction residual stress can be generated on a shallower portion near the surface of the material composing the threaded joint for an oil well pipe, and thus the fatigue fracture strength is further improved.

In the present invention, particles having a particle diameter distribution having one peak may be used.

Further, plural kinds of particles having different peaks may be mixed to be used. Two or more kinds of particles with different diameter peaks are prepared, and after one particle is injected, the other particles may be sequentially injected. In the case of such a constitution, it is preferable that particle with a larger particle diameter is firstly injected from the viewpoint that the surface roughness of the material to be treated after injection is decreased. When the finished surface roughness is decreased, higher fatigue fracture strength can be obtained.

In the second aspect (including respective modified examples), it is preferable that the injecting and spraying treatment is performed to only an incomplete threaded portion.

In the case of such a constitution, the mechanism is not clear, but the fatigue fracture strength can be further improved.

Further, in the second aspect (including respective modified examples), it is preferable that the injecting and spraying treatment is executed at 3 sec/cm$^2$ or less (the injecting and spraying treatment is executed at 3 seconds or less on each surface to be treated of 1 cm$^2$).

Accordingly, the micro-shot peening treatment can be applied to the threaded joint for an oil well pipe efficiently.

EFFECT OF THE INVENTION

According to the present invention, the micro-shot peening is applied to the threaded joint for an oil well pipe, so that the fatigue fracture strength can be improved. The application of the micro-shot peening can achieve the object more easily and more inexpensively than the other means, and another means such as a combination of carburizing and nitriding treatments can further improve the fatigue fracture strength.

BEST MODE FOR CARRYING OUT THE INVENTION

The present invention will be explained concretely below based on examples.

EXAMPLE 1

A male threaded part of a special threaded joint for an oil well pipe having a buttress type thread shape was cut into a rectangle with a width of 25 mm in an axial direction, and a change in a surface residual stress of a thread bottom due to micro-shot peening was examined while a shot condition was being changed.

<Material Under Test>

The male threaded part of the special threaded joint for an oil well pipe was used as a material under test. Specifications of the special threaded joint for an oil well pipe were as follows:

Nominal outside diameter: 177.80 mm
Nominal sectional thickness: 11.51 mm
Material: API P110
Yield stress: ≧758 Mpa <Shape of Material Under Test and Surface Residual Stress Measuring Position>

Figure 1:
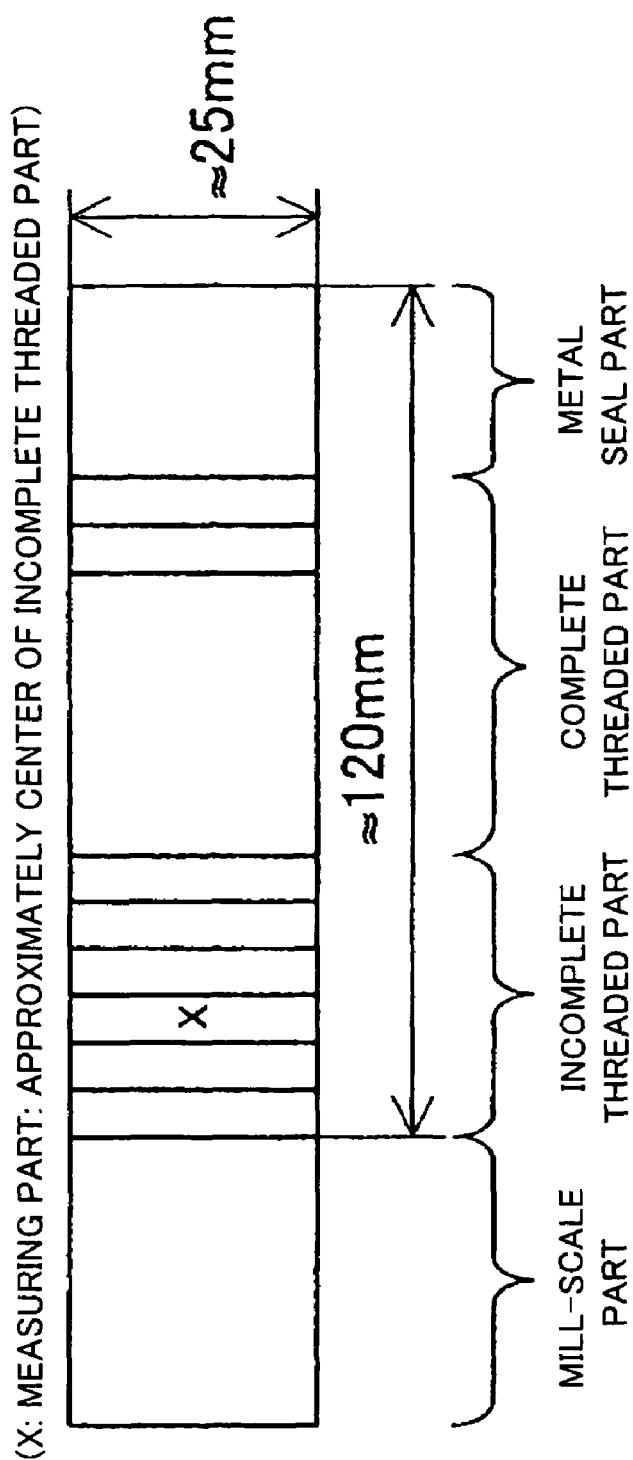
FIG. 1 is a diagram illustrating a shape and a measuring position of a material under test used in an example 1.
Figure 2:
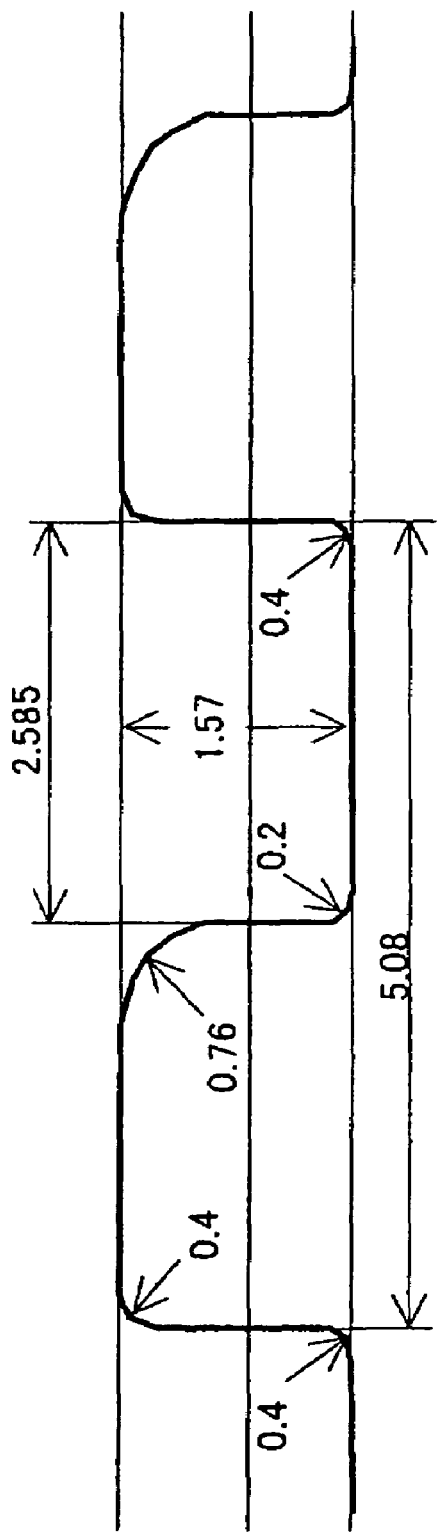
FIG. 2 is a diagram illustrating a shape and a dimension of a thread formed on the material under test of FIG. 1.

As shown in FIG. 1, the male threaded part of the special thread for an oil well pipe was axially cut out into a rectangle with a width of 25 mm and a length of about 120 mm in an axial direction so as to be a material under test. A measured portion of the surface residual stress is a place shown by a mark "X" in FIG. 1. This is approximately the center of an incomplete threaded part (threaded bottom). For reference, the shape of the thread as well as its dimension is shown in FIG. 2.

<Conditions of Micro-Shot Peening Treatment>

Carbon steel fine particle (HRC60 or more) whose carbon content is 0.8 to 1.0% was used. Mixture including three kinds of particles whose particle diameters (median) were 0.5 mm, 50 μm, and 0.5 mm and 50 μm was used. The measurement was made under three conditions that spraying pressure was 0.3 MPa, 0.4 MPa and 0.5 MPa. A nozzle distance (a distance from a nozzle to material surface to be treated) was 100 to 150 mm, and the measurement was made in a manner that the nozzle distance is uniform under each condition. The micro-shot peening treatment time in each treatment was 2 sec/cm$^2$.

<Axial-Direction Residual Stress>

A micro-part X-ray stress measuring device was used. Characteristic X-ray CrKα was used. The measuring conditions were as follows:

Diffraction face: (211)
Diffraction angle: 156.4
Pipe voltage: 40 KV
Pipe current: 30 mA
Measuring direction: axial direction
Measuring position: center of pipe bottom
Measuring method: iso-inclination method The measured results as well as the conditions of the micro-shot peening treatment are shown in Table 1.

TABLE 1

Micro-shot peening compressive residual stress measured results (thread surface)

| | Shot peening conditions | | | | Axial-direction residual stress (MPa) |
|---|---|---|---|---|---|
| | Particle diameter | Spraying air-pressure | Nozzle distance | Particle material | |
| Example 1-1 | 0.5 mm | 0.3 MPa | 100 to 150 mm | 0.8 to 1.0% Carbon steel | −600 |
| Example 1-2 | 0.5 mm | 0.4 MPa | 100 to 150 mm | 0.8 to 1.0% Carbon steel | −600 |
| Example 1-3 | 0.5 mm | 0.5 MPa | 100 to 150 mm | 0.8 to 1.0% Carbon steel | −450 |
| Example 1-4 | 50 μm | 0.3 MPa | 100 to 150 mm | 0.8 to 1.0% Carbon steel | −580 |
| Example 1-5 | 50 μm | 0.4 MPa | 100 to 150 mm | 0.8 to 1.0% Carbon steel | −520 |
| Example 1-6 | 50 μm | 0.5 MPa | 100 to 150 mm | 0.8 to 1.0% Carbon steel | −580 |
| Example 1-7 | 0.5 mm + 50 μm | 0.3 MPa | 100 to 150 mm | 0.8 to 1.0% Carbon steel | −530 |
| Example 1-8 | 0.5 mm + 50 μm | 0.4 MPa | 100 to 150 mm | 0.8 to 1.0% Carbon steel | −490 |
| Example 1-9 | 0.5 mm + 50 μm | 0.5 MPa | 100 to 150 mm | 0.8 to 1.0% Carbon steel | −540 |
| Comparative example 1-1 | Not treated | Not treated | Not treated | Not treated | 400 |

The case where a numerical value of the residual stress is "+" represents tensile-direction stress, and the case of "−" represents compression-direction stress. The axial-direction residual stress before the micro-shot peening treatment (comparative example 1-1) was +400 MPa, but the axial-direction residual stress after the treatment was −450 Mpa or less. It is, therefore, found that the axial-direction compressive residual stress increases by about 1000 MPa due to the micro-shot peening treatment.

EXAMPLE 2

The pipe material which is the same as that in the example 1 was used, and a flat-worked part was subject to the micro-shot peening treatment, and the axial-direction compressive residual stress after and before the treatment was examined in a depthwise direction.

<Shape of Material under Test and Surface Residual Stress Measuring Position>

Figure 3:
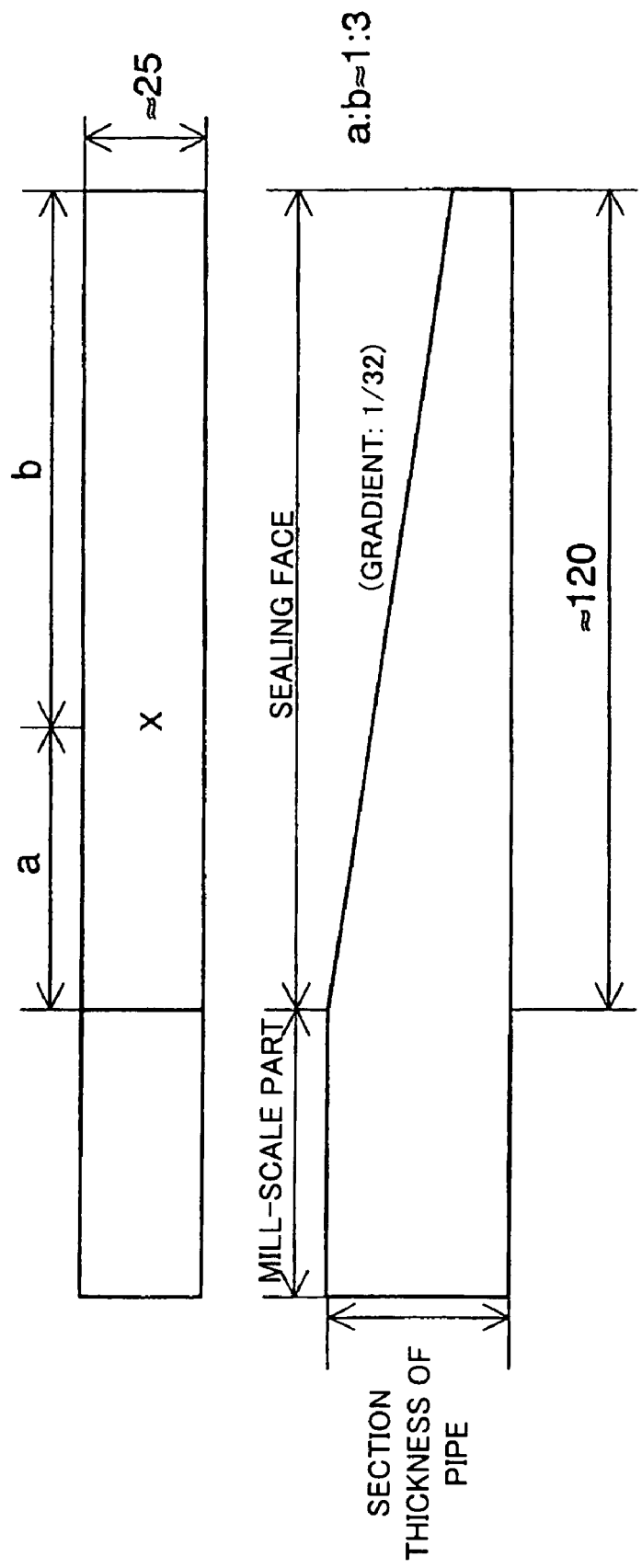
FIG. 3 is a diagram illustrating a shape and a measuring position of a material under test used in an example 2.

The shape of a material under test used in this example is shown in FIG. 3. In FIG. 3, a mill-scale surface was arranged on the approximately third part of the left side of the material under test, and a residual part is a sealing worked face. In the case where the sealing worked face was:

$a:b=1:2$, a point marked by "x" in the drawing was a measuring point, and the residual stress at a depth of every 10 μm from the surface up to 50 μm was measured. The conditions of the micro-shot peening treatment are as follows:

<Conditions of the Micro-shot Peening Treatment>

Carbon steel fine particles with carbon content of 0.8 to 1.0% (HRC60 or more) were used. The conditions of a particle diameter (median) were as follows:
 a: 50 μm
 b: 200 to 600 μm
 c: mixture of a and b
 d: 100 μm The spraying pressure was uniformly 0.5 MPa, the nozzle distance (distance from the nozzle to the material surface to be treated) was 100 to 150 mm, and the treatment time was uniformly about 2 sec/cm$^2$.

Figure 4:
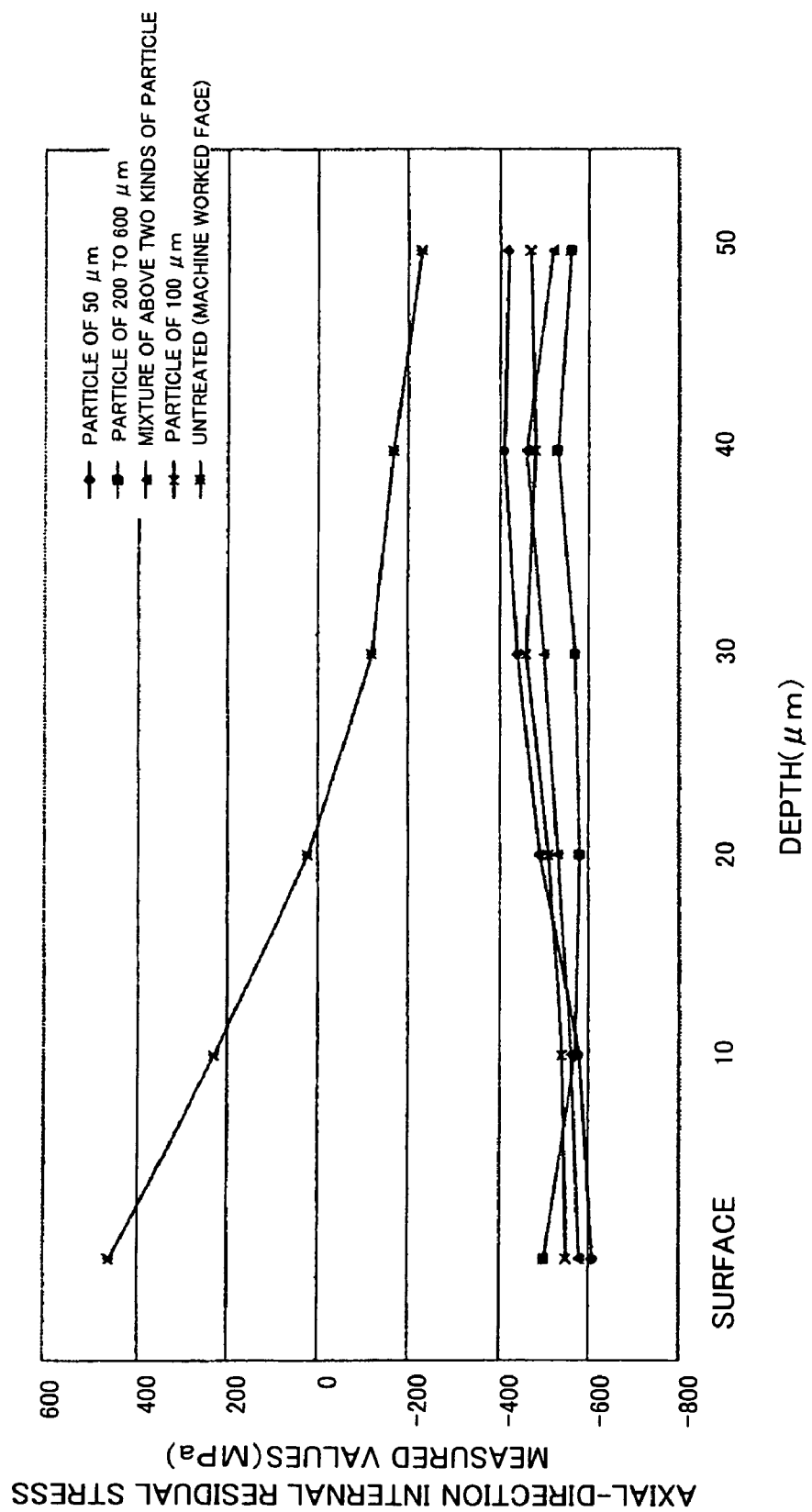
FIG. 4 is a graph illustrating measured values of an axial-direction compressive residual stress in a depthwise direction.

The measured results as well as the micro-shot peening treatment conditions are shown in Table 2 and FIG. 4.

TABLE 2

Results of measuring micro-shot peening axial-direction compressive residual stress Depthwise-direction distribution measured values

| | Particle diameter (μm) | Spraying pressure (MPa) | Nozzle distance (mm) | Particle material | Axial-direction residual stress measured values (depthwise-direction distribution) | | | | | |
|---|---|---|---|---|---|---|---|---|---|---|
| | | | | | Surface | −10 μm | −20 μm | −30 μm | −40 μm | −50 μm |
| Example 2-1 | 50 | 0.5 | 100 to 150 | 0.8 to 1.0% Carbon steel | −610 | −580 | −490 | −440 | −410 | −420 |
| Example 2-2 | 200 to 600 | 0.5 | 100 to 150 | 0.8 to 1.0% Carbon steel | −500 | −570 | −580 | −570 | −530 | −560 |
| Example 2-3 | mixture of (2-1) and (2-2) | 0.5 | 100 to 150 | 0.8 to 1.0% Carbon steel | −580 | −560 | −530 | −500 | −460 | −520 |

TABLE 2-continued

Results of measuring micro-shot peening axial-direction compressive residual stress
Depthwise-direction distribution measured values

| | Particle diameter (μm) | Spraying pressure (MPa) | Nozzle distance (mm) | Particle material | Axial-direction residual stress measured values (depthwise-direction distribution) | | | | | |
|---|---|---|---|---|---|---|---|---|---|---|
| | | | | | Surface | −10 μm | −20 μm | −30 μm | −40 μm | −50 μm |
| Example 2-4 | 100 | 0.5 | 100 to 150 | 0.8 to 1.0% Carbon steel | −550 | −540 | −510 | −460 | −480 | −470 |
| Comparative example 2-1 | | Not treated (just cut and mill) | | | +460 | +230 | +20 | −120 | −170 | −230 |

Figure 5:
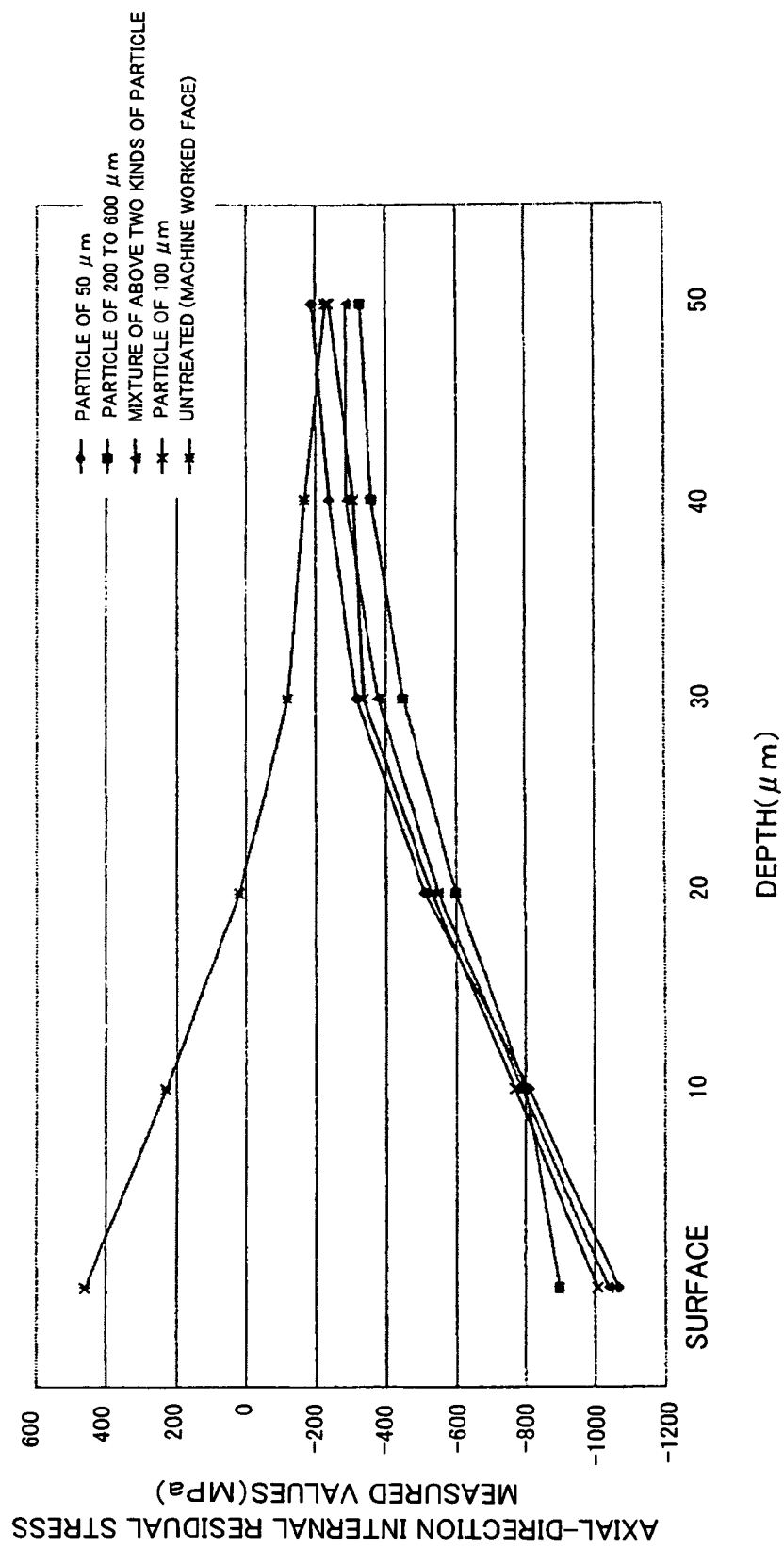
FIG. 5 is a graph illustrating an amount of the axial direction compressive residual stress change in the depthwise direction.

Further, Table 3 and FIG. 5 show amounts of axial-direction residual stress change before and after the micro-shot peening treatment for each of the materials under test used in examples 2-1 to 2-4.

TABLE 3

Distribution of amount of micro-shot peening axial-direction
compressive residual stress change
(Distribution of depthwise-direction change amount)

| | Amount of axial-direction residual stress change (depthwise-direction distribution) | | | | | |
|---|---|---|---|---|---|---|
| | Surface | −10 μm | −20 μm | −30 μm | −40 μm | −50 μm |
| Example 2-1 | −1070 | −810 | −510 | −320 | −240 | −190 |
| Example 2-2 | −960 | −800 | −600 | −450 | −360 | −330 |
| Example 2-3 | −1040 | −790 | −550 | −380 | −290 | −290 |
| Example 2-4 | −1010 | −770 | −530 | −340 | −310 | −240 |

A change in the axial-direction compressive residual stress is the largest on the surface, and it tends to be smaller in deeper parts, but the axial-direction compressive residual stress is 400 to 600 MPa from the surface to the part with a depth of 50 μm, and thus the effect of the micro-shot peening is produced. Further, when the residual stress measured results on the milling face before treatment in comparative example 2 are checked, the tensile residual stress is nearly +500 MPa on the surface. The residual stress decreases in deeper parts, the tensile residual stress is changed into compressive residual stress at a depth of 30 μm, and the compressive residual stress becomes 200 MPa at a depth of 50 μm. This means that the tensile residual stress due to working is generated on the surface. Since the residual stress on the surface of the threaded face in example 1 is tensile residual stress of +400 MPa (see comparative example 1-1), it is considered that the distribution of the residual stress in the depthwise direction is approximately similar also in example 1. According to the data of examples 1 and 2, it is found that the residual stress on the surface part greatly changes from the tensile direction into the compressive direction due to the micro-shot peening treatment.

EXAMPLE 3

A material test was conducted and an actual effect was checked.

<Material Under Test>

Dimension: nominal outside diameter 177.8 mm×nominal section thickness 11.51 mm

Material: oil well pipe material P110

Yield strength: 758 MPa to 965 MPa (110 ksi to 140 ksi)

Minimum tensile strength: 862 MPa (125 ksi)

Threaded joint: special joint for OCTG (buttress type threaded shape seal and shoulder)

<Test Conditions>

(1) Fatigue Test System: Four-Point Bending Type Rotary bending fatigue test

Figure 6:
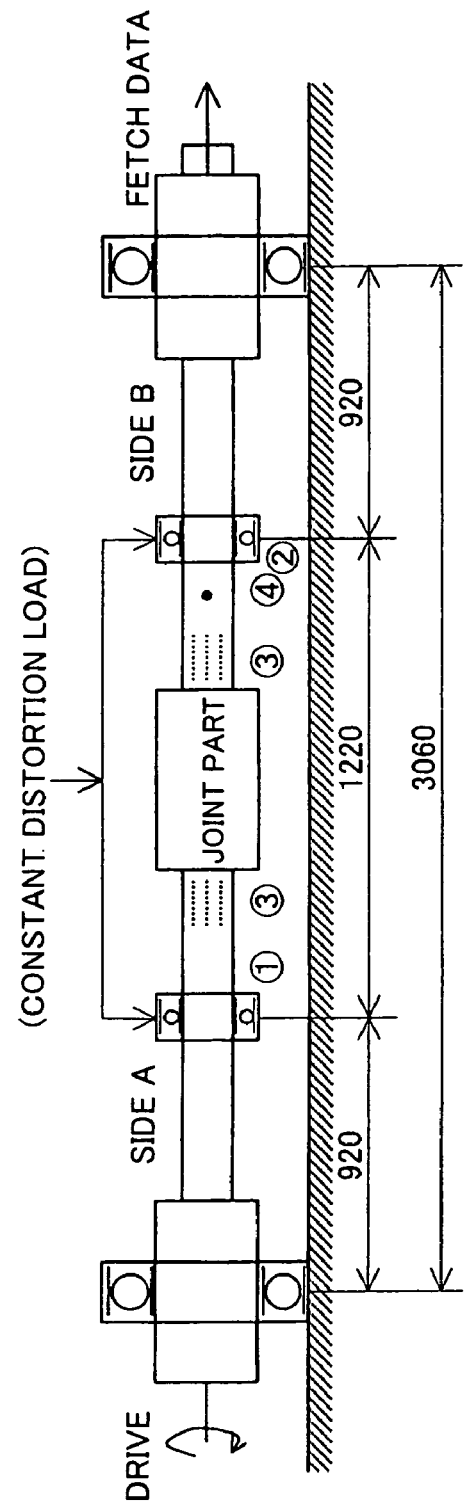
FIG. 6 is a diagram illustrating a constitution of a four-point bending type rotary bending fatigue testing machine.
Figure 7:
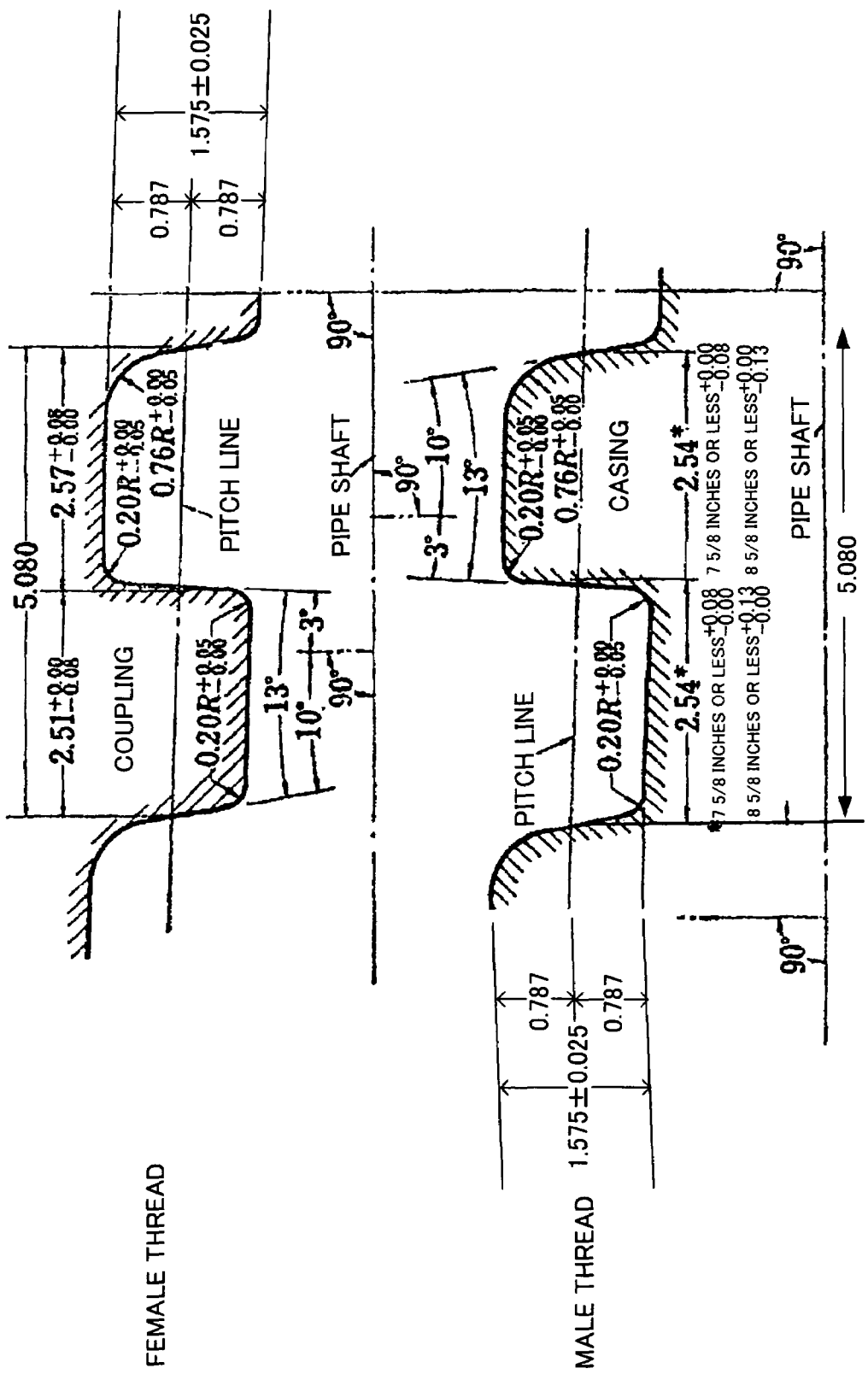
FIG. 7 is a diagram illustrating a buttress thread shape.
Figure 8:
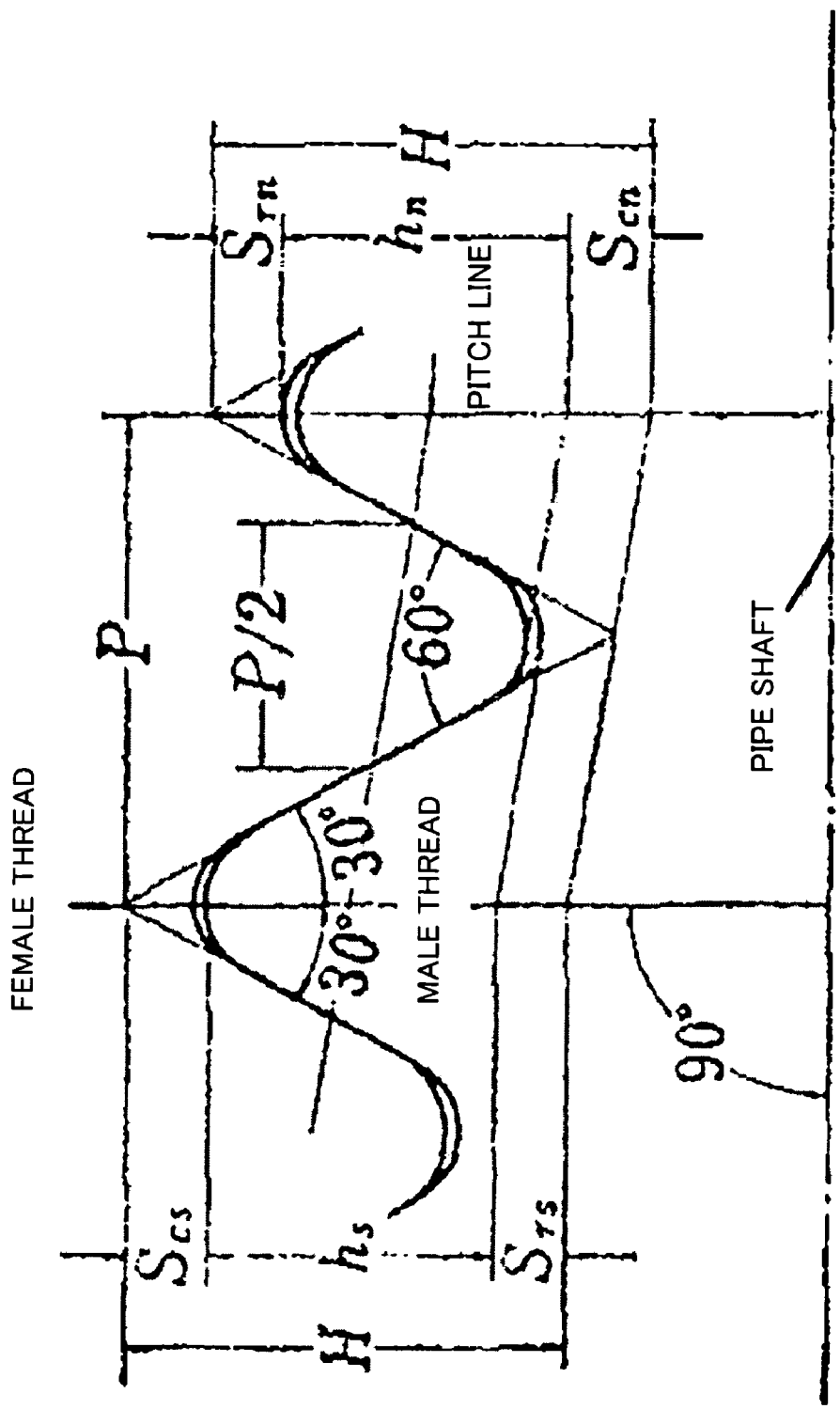
FIG. 8 is a diagram illustrating an API round thread shape.

The summary and schematic dimensions of a testing machine is shown in FIG. 6.

(2) Test Conditions

Bending set angle: 13°/30.48 m (13°/100 ft; an angle at which a length of an arc of 100 ft is predicted is 13°. Target setting stress: ±13.8 MPa)

Rotary speed: 166 min$^{-1}$ (166 rpm)

When a filler gas internal pressure is decreased by about 0.5 MPa, generation of crack is detected.

(3) Shot Peening Conditions

Spraying pressure: 0.4 Mpa

Spraying distance: 100 to 150 mm

Spraying time: about 1 sec/cm$^2$

Shot particle material: carbon steel of 0.8 to 1.0% C (HRC60 or more)

Particle diameter: shown in Table 4

(4) Evaluating Method

A test revolution number until the generation of crack was surveyed. This test revolution number was compared with a test revolution number relating to a material under test which is not subject to the micro-shot peening treatment so as to be evaluated.

<Test Result>

The particle diameters and the test results are shown in Table 4. "Crack on threaded part" shown in the result means that crack is generated on the threaded part to be tested, and "crack on bending load part" means that crack is generated on positions designated by reference numerals 1 and 2 in FIG. 6, namely, an end part where a bearing inner ring of a load part touches a pipe outer surface so that the test on the threaded part to be suspended without damage. "main body damaged part" means that crack is generated on a part of the pipe main body in the position designated by reference numeral 3 in FIG. 6 which is damaged (chuck damage or the like at the time of screwing the joint), and thus the test on the threaded part to be tested is suspended without damage. "Crack on main body surface defective part" means that crack is generated due to a small surface defect (small one which does not become a problem in the specification of normal pipes) on the surface of the test pipe main body in a position designated by reference numeral 4 in FIG. 6 (between the joint part and the load part) and thus the test on the threaded part to be tested is suspended without damage.

TABLE 4

Actual test results

| | Particle diameter | Test revolution number until the generation of crack × 1000 | Reason for suspension of test | Multiple of increase in number of test times |
|---|---|---|---|---|
| Example 3-1 | 50 μm | 885,200 | Crack on threaded part | 2.1 |
| Example 3-2 | 200 to 600 μm | 536,900 | Crack on bending load part | 1.3 |
| Example 3-3 | mixture of (3-1) and (3-2) | 576,300 | Crack on main body damaged part | 1.3 |
| Example 3-4 | 100 μm | 518,700 | Crack on main body surface defective part | 1.2 |
| Example 3-5 | 50 μm | 935,500 | Crack on bending load part | 2.2 |
| Example 3-6 | 50 μm | 845,000 | Crack on bending load part | 2 |
| Example 3-7 | 50 μm (only incomplete threaded part) | 1,151,800 | Crack on bending load part | 2.7 |
| Example 3-8 | mixture of (3-1) and (3-2) | 674,100 | Crack on bending load part | 1.6 |
| Comparative example 3-1 | None | 418,700 | Crack on threaded part | (1.0) |
| Comparative example 3-2 | None | 438,500 | Crack on threaded part | (1.0) |

As is clear from the test results in Table 4, when the threaded joint surface is subject to the micro-shot peening treatment, the test revolution number until the generation of crack increases and the fatigue fracture strength is improved (Examples 3-1 to 3-8). When the material under test using the particle with a particle diameter of 50 μm (examples 3-1, 5, 6, 7) have test revolution number which is twice as much as that of untreated materials under test, and thus notable effect is produced. Further, as to the material under test in which only the incomplete is subject to the micro-shot peening (example 3-7), the test revolution number is further improved.

The test on the materials under test other than the example 3-1 which are subject to the micro-shot peening treatment is suspended due to crack generated on the parts other than the threaded joints. It can be said that their fatigue fracture strength on the joint portions are improved to at least numerical values shown in the test results in Table 4. It is estimated that the fatigue fracture strength on the joint portions are substantially improved to the numerical values in the test results in Table 4 or more.

The present invention is explained in relation to the examples which are seemed to be the most practical and preferable at the present, but the present invention is not limited to the examples disclosed in the specification of this application, the invention can be suitably changed without departing from the gist and idea readable from the claims and the entire specification. It shall be understood that the joint for an oil well pipe which involves such changes and the method for manufacturing the same are intended to be embraced in the technical scope of the present invention.

The invention claimed is:

1. A threaded joint for an oil well pipe in which a threaded bottom part of the threaded joint has an axial-direction residual stress of a −400 MPa or less as measured by analysis between a surface of the threaded bottom part and a part with a depth of 40 μm from the surface of the threaded bottom part.

2. A method for manufacturing a threaded joint for an oil well pipe, comprising a step of injecting and spraying particles having a hardness of HRC50 or more and having a particle diameter of 30 to 300 μm to a surface of the threaded joint to be treated at air pressure of 0.3 to 0.5 MPa.

3. The method for manufacturing the threaded joint for an oil well pipe according to claim 2, wherein a thread shape of the threaded joint for an oil well pipe one of an API buttress thread and a round thread.

4. The method for manufacturing the threaded joint for an oil well pipe according to claim 2, wherein the particle diameter is 50 to 100 μm.

5. The method for manufacturing the threaded joint for an oil well pipe according to claim 2, wherein the particles are injected and sprayed to only an incomplete threaded portion of the threaded joint.

6. The method for manufacturing the threaded joint for an oil well pipe according to claim 2, wherein the particles are injected and sprayed at 3 sec/cm$^2$ or less.

7. The method for manufacturing the threaded joint for an oil well pipe according to claim 3, wherein the particle diameter is 50 to 100 μm.

8. The method for manufacturing the threaded joint for an oil well pipe according to claim 3, wherein the particles are injected and sprayed to only an incomplete threaded portion of the threaded joint.

9. The method for manufacturing the threaded joint for an oil well pipe according to claim 4, wherein the particles are injected and sprayed to only an incomplete threaded portion of the threaded joint.

10. The method for manufacturing the threaded joint for an oil well pipe according to claim 3, wherein the particles are injected and sprayed at 3 sec/cm$^2$ or less.

11. The method for manufacturing the threaded joint for an oil well pipe according to claim 4, wherein the particles are injected and sprayed at 3 sec/cm$^2$ or less.

12. The method for manufacturing the threaded joint for an oil well pipe according to claim 5, wherein the particles are injected and sprayed at 3 sec/cm$^2$ or less.

* * * * *